United States Patent
Shimada et al.

[11] Patent Number: 5,892,674
[45] Date of Patent: Apr. 6, 1999

[54] METHOD AND APPARATUS FOR POWER CONVERTING AC INTO DC OR DC INTO AC BY CONVERTER HAVING COMMON PHASE CONNECTION

[75] Inventors: Keizo Shimada, Ibaraki-ken; Hideyasu Umetsu; Hideaki Kunisada, both of Hitachi, all of Japan

[73] Assignee: Hitachi, Ltd., Tokyo, Japan

[21] Appl. No.: 799,761

[22] Filed: Feb. 12, 1997

[30] Foreign Application Priority Data

Feb. 16, 1996 [JP] Japan .................................. 8-029083

[51] Int. Cl.⁶ .................................................. H02M 7/217
[52] U.S. Cl. ...................................... 363/127; 363/87
[58] Field of Search ................................ 363/81, 84, 87, 363/88, 125, 127, 128, 89, 34, 36, 38

[56] References Cited

U.S. PATENT DOCUMENTS

| | | | |
|---|---|---|---|
| 4,816,985 | 3/1989 | Tanahashi | 363/81 |
| 4,984,147 | 1/1991 | Araki | 363/84 |
| 5,140,514 | 8/1992 | Tuusa et al. | 363/81 |
| 5,255,175 | 10/1993 | Uchino | 363/81 |
| 5,483,435 | 1/1996 | Uchino | 363/81 |
| 5,504,667 | 4/1996 | Tanaka et al. | 363/37 |

FOREIGN PATENT DOCUMENTS 5-15171  1/1993  Japan .

*Primary Examiner*—Adolf Deneke Berhane
*Attorney, Agent, or Firm*—Antonelli, Terry, Stout & Kraus, LLP

[57] ABSTRACT

In a power converter apparatus having a three-phase AC power supply connecting unit, a positive side capacitor, a negative side capacitor, first-phase and third-phase converting circuits each including switching elements connected in series, and a common phase for connecting a neutral polarity to a second phase, there are provided a common phase converting circuit including two switching elements connected in series between positive and negative polarities, a change detector for detecting a temporal change of an electric current flowing through the common phase, and a duty controller for changing the on-off duty of the switching elements in the common phase converting circuit on the basis of the temporal change.

17 Claims, 8 Drawing Sheets

5,892,674

1

METHOD AND APPARATUS FOR POWER CONVERTING AC INTO DC OR DC INTO AC BY CONVERTER HAVING COMMON PHASE CONNECTION

BACKGROUND OF THE INVENTION

The present invention relates to a power converter apparatus for converting alternating current (AC) into direct current (DC) or vice versa and more particularly, to a power converter apparatus in which at least one of input and output is AC, part of the circuit is a three-line DC circuit having positive, neutral and negative polarities, capacitors are connected between the positive and neutral polarities and the neutral and negative polarities, respectively, and one phase of AC is common to the neutral polarity of DC.

Structurally, in a power converter apparatus for converting AC input into DC and then converting the DC into AC output in which one phase of input AC, a neutral polarity of DC and one phase of output AC are common to each other, current in one phase of AC connected to the neutral polarity of DC flows into a capacitor of the DC circuit or flows out of the capacitor, as described in JP-A-5-15171.

Problems encountered in the prior art will be described with reference to FIGS. 7 and 8. A circuit diagram of the prior art power converter apparatus is shown in FIG. 7 and the power converter apparatus as shown is a three-phase AC input type forward converter which receives three-phase AC having first to third phases via a three-phase AC power supply connecting unit 1 and delivers three-line DC of positive, neutral and negative polarities to an external load via a load connecting unit 62. A forward converter has the three-phase AC power supply connecting unit 1, the load connecting unit 62, transistors 5 and 6 connected in series between the positive and negative polarities, diodes 11 and 12 connected in anti-parallel relation to the transistors 5 and 6, respectively, a reactor 2 connected between a connecting node of the transistors 5 and 6 and a first phase of the three-phase AC power supply connecting unit 1, transistors 9 and 10 connected in series between the positive and negative polarities, diodes 15 and 16 connected in anti-parallel relation to the transistors 9 and 10, respectively, a reactor 4 connected between a connecting node of the transistors 9 and 10 and a third phase of the three-phase AC power supply connecting unit 1, and two capacitors 17 and 18 connected in series between the positive and negative polarities with their node being connected to a second phase of the three-phase AC power supply connecting unit 1 and the neutral polarity. Namely, the forward converter serves as a power converter apparatus which has two half-bridge type converting circuits (also called single-phase forward converters of half-bridge type) and converts three-phase AC into three-line DC. In the following description, the three-phase AC power supply connecting unit 1 is simply referred to as a three-phase AC power supply 1 and the load connecting unit 62 as a load unit 62.

By on-off controlling the transistors 5, 6, 9 and 10, an operation can be ensured in order that an AC input current has a waveform which is ideally a sine wave while being synchronous and in phase with input voltage to have a power factor of 1 and a converted output voltage is rendered to be constant. But to establish this state, completely balanced three-phase AC must be generated in the two half-bridge type single-phase forward converter.

When sine wave current of balanced three phases is supplied from the three-phase power supply, supplied power is temporally constant power. Accordingly, a terminal voltage $v_{dc}$ across the two series-connected capacitors 17 and 18 in FIG. 7 is complete DC removed of ripple. On the other hand, AC current flowing out of the second phase of the three-phase AC power supply 1 totally flows into the capacitors 17 and 18, provided that no current flows to the neutral polarity from the load unit 62. Accordingly, ripple voltages of the same frequency as that of the AC power supply are caused in terminal voltages $v_{C1}$ and $v_{C2}$ across the respective capacitors 17 and 18 unless the electrostatic capacitance of the capacitors 17 and 18 is infinite.

An internal waveform in the power converter apparatus of FIG. 7 is shown in FIG. 8, indicating that a ripple as shown in FIG. 8 is involved in the relation among the aforementioned $v_{dc}$, $v_{C1}$, and $v_{C2}$.

More specifically, the ripple voltage can be calculated as follows. It is now assumed that a sine wave current having a peak value I flows out of the second phase of the three-phase AC power supply 1. Inflow electric charge Qx during a half cycle T/2 of power supply period T is determined by integrating a positive half cycle of the sine wave having period T and amplitude I to provide a relation of $Qx = T \cdot I / \pi$.

The Qx is a difference between electric charges stored in the capacitors 17 and 18. Accordingly, given that each of the capacitors 17 and 18 has the same electrostatic capacitance which is C, $C \cdot v_{C1} - C \cdot v_{C2} = Qx$ holds.

Given that the difference ($V_{C1} - V_{C2} = \Delta V$) between terminal voltages of the capacitors 17 and 18 is $\Delta V$, $C \cdot \Delta V = Qx$ holds and accordingly, a relation of $\Delta V = (T \cdot I)/(\pi \cdot C)$ can be obtained.

For example, when AC is of 200 V, 50 Hz and 10 kVA and capacitors of 10 mF are used as the capacitors 17 and 18, T=20 ms and I=40.8 Ap hold and $\Delta V$=26.0 Vpp is obtained from the above relation.

With the change in the neutral point of DC as above, a phase shift and waveform distortion are caused in AC side voltage of the converter even if the transistors 5, 6, 9 and 10 are supplied with an on/off signal resulting from pulse-width modulation (PWM) of a complete sine wave, raising a problem that the input current phase is shifted and the input current waveform is distorted. Further, as $\Delta V$ increases, there occurs a time interval during which necessary DC voltage is not obtained, with the result that the AC side voltage of the forward converter cannot reach a peak to cause a time interval during which control is invalidated. Then, the distortion in the input current waveform increasingly grows.

By increasing the capacitance of the capacitors 17 and 18, the neutral point is rendered to be stable and the above problems can be solved. However, mounting of capacitors of large capacitance leads to problems that the cost and the size are raised.

SUMMARY OF THE INVENTION

An object of the present invention is to provide a compact and easy-to-use power converter apparatus which can make voltage on the neutral point stable.

In accordance with one aspect of the present invention, to accomplish the above object, in a power converting method for converting AC into DC of positive, neutral and negative polarities, a temporal change of current flowing through the neutral polarity is detected, and the current is controlled on the basis of the detected temporal change such that the current flows to the positive polarity side or the negative polarity side to thereby cause the temporal change to be zero or to approach zero.

In accordance with another aspect of the present invention, in a power converter apparatus comprising a positive side capacitor connected between positive and neutral polarities of DC, a negative side capacitor connected between neutral and negative polarities of the DC, a first phase half-bridge type converting circuit including two switching elements connected in series between the positive and negative polarities, diodes connected in anti-parallel relation to the switching elements, respectively, and a reactor connected between a connecting node of the two series-connected switching elements and a first phase of AC, a third-phase half-bridge type converting circuit including two switching elements connected in series between the positive and negative polarities, diodes connected in anti-parallel relation to the switching elements, respectively, and a reactor connected between a connecting node of the two series-connected switching elements and a third phase of AC, and a common phase connecting the neutral polarity of DC and a second phase of AC, whereby the AC having the first to third phases is converted into the DC having the positive, neutral and negative polarities, there are provided a common phase half-bridge type converting circuit including two switching elements connected in series between the positive and negative polarities, diodes connected in anti-parallel relation to the two series-connected switching elements, respectively, and a reactor connected between a connecting node of the two series-connected switching elements and the common phase, a change detecting circuit detecting a temporal change of an electric signal flowing through the common phase, and a duty controlling circuit changing the on/off duty of the two series-connected switching elements in the common phase half-bridge type circuit on the basis of the temporal change of the electric signal detected by said detecting circuit.

According to still another aspect of the present invention, in a power converter apparatus comprising a forward converter for converting input three-phase AC into three-line DC and an inverter having two half-bridge type converting circuits for converting positive and negative polarities of the three-line DC so as to deliver two phases of AC from the half-bridge type converting circuits and to deliver remaining one phase of the AC from a common phase connected to a neutral polarity of the three-line DC, the inverter has a common phase half-bridge type converting circuit including two switching elements connected in series between the positive and negative polarities, diodes connected in anti-parallel relation to the switching elements, respectively, and a reactor connected between a node of the two series-connected switching elements and the common phase, a change detecting circuit detecting a temporal change of an electric signal flowing through the common phase, and a duty controlling circuit changing the on/off duty of the two series-connected switching elements in the common phase half-bridge circuit on the basis of the temporal change of the electric signal detected by the change detecting circuit.

According to the present invention, there is provided a compact and easy-to-use power converter apparatus which can make voltage at the neutral point stable.

DESCRIPTION OF THE PREFERRED EMBODIMENTS

The embodiments of the present invention will now be described by way of example with reference to the accompanying drawings.

Figure 1:
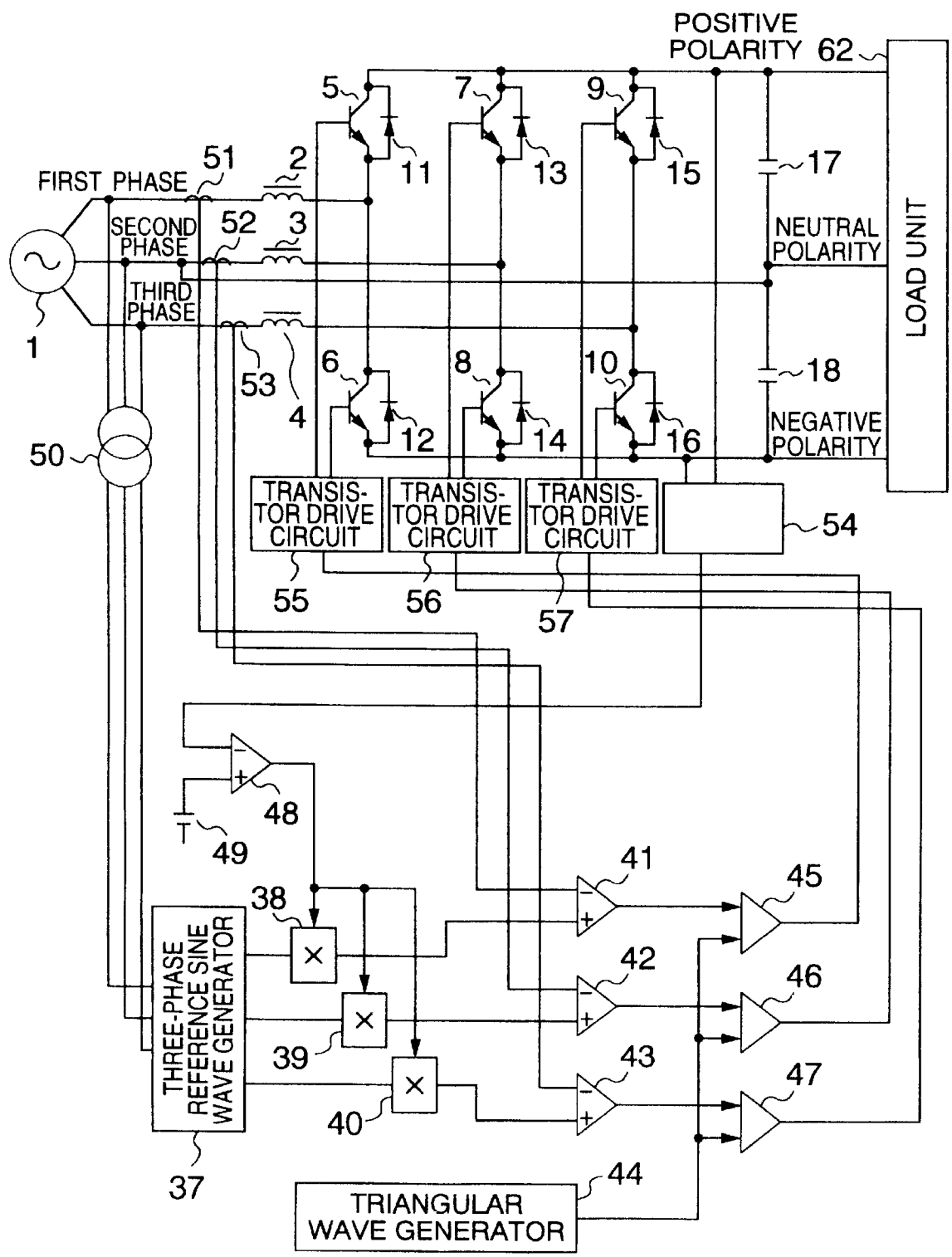
FIG. 1 is a circuit diagram showing a power converter apparatus according to a first embodiment of the present invention.

Referring to FIG. 1, there is illustrated a circuit diagram of a power converter apparatus according to a first embodiment of the invention. The power converter apparatus serves as a forward converter which receives three-phase alternating current (AC) having first to third phases via a three-phase AC power supply connecting unit 1 (hereinafter referred to as a three-phase AC power supply 1) and delivers three-line DC of positive, neutral and negative polarities is delivered to an external load through a load connecting unit 62 (hereinafter referred to as a load unit 62), and is constructed as will be described below.

More particularly, the forward converter comprises a half-bridge type converting circuit corresponding to the first phase and including transistors 5 and 6 connected in series between the positive and negative polarities, diodes 11 and 12 connected in anti-parallel relation to the transistors 5 and 6, respectively, and a reactor connected between a connecting node of the transistors 5 and 6 and the first phase of the three-phase AC power supply 1, a half-bridge type converting circuit corresponding to the third phase and including transistors 9 and 10 connected in series between the positive and negative polarities, diodes 15 and 16 connected in anti-parallel relation to the transistors 9 and 10, respectively, and a reactor 4 connected between a connecting node of the transistors 9 and 10 and the third phase of the three-phase AC power supply 1, and two capacitors 17 and 18 connected in series across the series-connected transistors 5 and 6 and the series-connected transistors 9 and 10. The two capacitors 17 and 18 are used in common for the transistors 5, 6 and the transistors 9, 10 and are connected to the transistors 5 and 6 as well as the transistors 9 and 10 in the same direction.

Then, the second phase of the three-phase AC power supply 1 is connected to the neutral polarity of three-line DC to form a common phase which in turn is connected to a connecting node of the two series-connected capacitors 17 and 18. Accordingly, the capacitor 17 is a positive side capacitor connected between the positive polarity and the neutral polarity (common phase) and the capacitor 18 is a negative side capacitor connected between the neutral polarity (common phase) and the negative polarity. Further, three terminals of positive, neutral and negative polarities of the two series-connected capacitors 17 and 18 are connected to the load unit 62 through which the three-line DC is delivered to the external load.

In the present embodiment, a half-bridge type converting circuit associated with the common phase (second phase) is additionally provided which includes transistors 7 and 8 connected in series between the positive and negative polarities, diodes 13 and 14 connected in anti-parallel relation to the transistors 7 and 8, respectively, and a reactor 3 connected between a node of the transistors 7 and 8 and the second phase of the three-phase power supply 1, and the series-connected transistors 7 and 8 are connected across the two series-connected capacitors 17 and 18 in the same directional relation to the transistors 5 and 6.

As described above, a main circuit of the power converter apparatus for conversion of three-phase AC into three-line DC is constructed of a full-bridge circuit.

The full-bridge circuit means a circuit configuration having half-bridge type converting circuits whose number corresponds to the number of phases of the power supply subjected to conversion and for example, a full-bridge circuit corresponding to a three-phase power supply has three half-bridge type converting circuits. A configuration having two half-bridge type converting circuits is called a half-bridge two-circuit configuration, which corresponds to the prior art example.

A control circuit for controlling the main circuit of the above full-bridge circuit configuration is constructed as will be described below. Voltages of the three-phase AC power supply 1 are detected by a three-phase transformer 50. Detected outputs are sent to a three-phase reference sine wave generator 37 which in turn delivers three sine waves synchronous with the respective phases of the three-phase AC power supply 1. On the other hand, a converter output or a terminal voltage across the two series-connected capacitors 17 and 18 is detected by an insulating amplifier 54. The thus detected value is sent to an operational amplifier 48, which subtracts the detected value of DC voltage from an output of a reference voltage source 49 to produce an output which in turn is multiplied by the three sine waves delivered out of the three-phase reference sine wave generator 37 by using multipliers 38, 39 and 40. It will be appreciated that outputs of the multipliers 38, 39 and 40 correspond to command values for line currents of the respective input three phases of the forward converter.

Next, an operational amplifier 41 performs subtraction between the output of the multiplier 38 and a value detected by a current transformer 51 for detecting current in the reactor 2 of the main circuit. An operational amplifier 42 performs subtraction between the output of the multiplier 39 and a value detected by a current transformer 52 for detecting current in the reactor 3 of the main circuit. An operational amplifier 43 performs subtraction between the output of the multiplier 40 and a value detected by a current transformer 53 for detecting current in the reactor 4 of the main circuit. Outputs of the operational amplifiers 41, 42 and 43 are compared with an output of a triangular wave generator 44 by means of comparators 45, 46 and 47, respectively. Outputs of these comparators serves as PWM signals.

The output of the comparator 45 is sent to a transistor drive circuit 55. The transistor drive circuit 55 responds to the PWM signal from the comparator 45 to alternately turn on and off the transistors 5 and 6. The output of the comparator 46 is sent to a transistor drive circuit 56. The transistor drive circuit 56 responds to the PWM signal from the comparator 46 to alternately turn on and off the transistors 7 and 8. The output of the comparator 47 is sent to a transistor drive circuit 57. The transistor drive circuit 57 responds to the PWM signal from the comparator 47 to alternately turn on and off the transistors 9 and 10.

Next, the operation of the aforementioned control circuit will be described. When DC voltage decreases, the output of the operational amplifier 48 is increased and the outputs of the multipliers 38, 39 and 40 resulting from multiplication by the output of the operational amplifier 48 are also increased. These outputs correspond to input current commands which eventually act on input currents from the three-phase AC power supply 1 to cause them to increase, with the result that DC voltage is increased. Conversely, with DC voltage increased, the output of the operational amplifier 48 is decreased and the outputs of the multipliers 38, 39 and 40 resulting from multiplication by the output of the operational amplifier 48 are also decreased. These outputs correspond to input current commands which eventually act on input currents from the three-phase power supply 1 to cause them to decrease, with the result that DC voltage is decreased. Through the above operation, terminal voltage across the two series-connected capacitors 17 and 18 can be kept to be constant.

On the other hand, by the action of the operational amplifier 41, current flowing through the reactor 2 can be controlled to a sine wave which is synchronous with the first phase of the three-phase AC power supply 1. Also, by the action of the operational amplifier 42, current flowing through the reactor 3 can be controlled to a sine wave synchronous with the second phase of the three-phase AC power supply 1. Further, by the action of the operational amplifier 43, current flowing through the reactor 4 can be controlled to a sine wave synchronous with the third phase of the three-phase AC power supply 1. On the other hand, the three outputs of the three-phase reference generator 37 have waveforms of three phases whose sum is always rendered to be 0 (zero). Currents in the reactors 2, 3 and 4 which are so controlled as to coincide with these waveforms also have waveforms whose sum is always rendered to be 0.

Accordingly, input current from the second phase of the three-phase AC power supply 1 is totally passed to the reactor 3 and no electric charge flows to the connecting node of the two series-connected capacitors 17 and 18 from the second phase of the three-phase AC power supply 1, so that no unbalance is caused between terminal voltages across the capacitors 17 and 18 regardless of electrostatic capacitance of the capacitors 17 and 18.

The above description "no electric charge flows to the connecting node of the two series-connected capacitors 17 and 18" can hold at the power supply frequency level. Strictly speaking, inflow/outflow of electric charge takes place at the switching frequency level of the transistors 7 and 8. But, in general, the switching frequency is larger than the power supply frequency by about double figures, so that a voltage change due to inflow/outflow of electric charge at the switching frequency level is smaller by about double figures, and hence the influence of the voltage change at the switching frequency level can be neglected, without leading to an increase in size of the capacitors, and "no electric charge flows to" can be supported. The same holds true for second to sixth embodiments to be described hereinafter.

In the present embodiment, the external load connected to the three-line DC is a load which is balanced between positive and negative polarities and so requires that the output current from the neutral polarity be 0 (zero).

The foregoing can be summarized as follows. In the case of the forward converter for obtaining three-line DC from three-phase AC, with the construction in which the full-bridge circuit has mutually connected three half-bridge type converting circuits and the common phase for connecting the second phase of AC to the neutral point of DC is formed, a temporal change of current flowing through the common phase which affects neutral point voltage of the two series-connected capacitors is detected and the on/off duty of transistors of the additionally provided half-bridge type converting circuit connected to the common phase is changed on the basis of the temporal change or the change with time.

Through this, input current flowing to the common phase from the three-phase power supply is passed to the half-bridge type converting circuit associated with the common phase via the reactor of the common phase and is prevented from flowing to the neutral point of the two series-connected capacitors. In other words, "the temporal change of current flowing to the neutral polarity can be rendered to be zero or to approach zero." holds. Accordingly, electric charges stored in the two series-connected capacitors are not unbalanced and even with small capacitances of the capacitors, a complete DC power supply can be obtained for providing voltage which does not change at both the positive and negative polarities of the three-line DC. Namely, a compact, easy-to-use power converter apparatus having stable voltage at the neutral point can be provided.

Incidentally, in the case of the first embodiment, the common phase half-bridge type converting circuit is comprised of the transistors 7 and 8, the diodes 13 and 14 connected in anti-parallel relation to the transistors 7 and 8, respectively, and the reactor 3 connected between the connecting node of the transistors 7 and 8 and the second phase of the three-phase AC power supply 1. This holds true for the second, third, fourth and sixth embodiments to be described hereinafter. Change detecting circuit corresponds to the insulating amplifier 54 and duty controlling circuit is comprised of the multiplier 39, operational amplifier 42, comparator 46, operational amplifier 48, reference voltage generator 49 and current transformer 52. It will be appreciated that the change detecting circuit may otherwise be defined as including the insulating amplifier 54, operational amplifier 48 and reference voltage generator 49 and so the above definition is an example. This holds true for embodiments to be described later.

Figure 2:
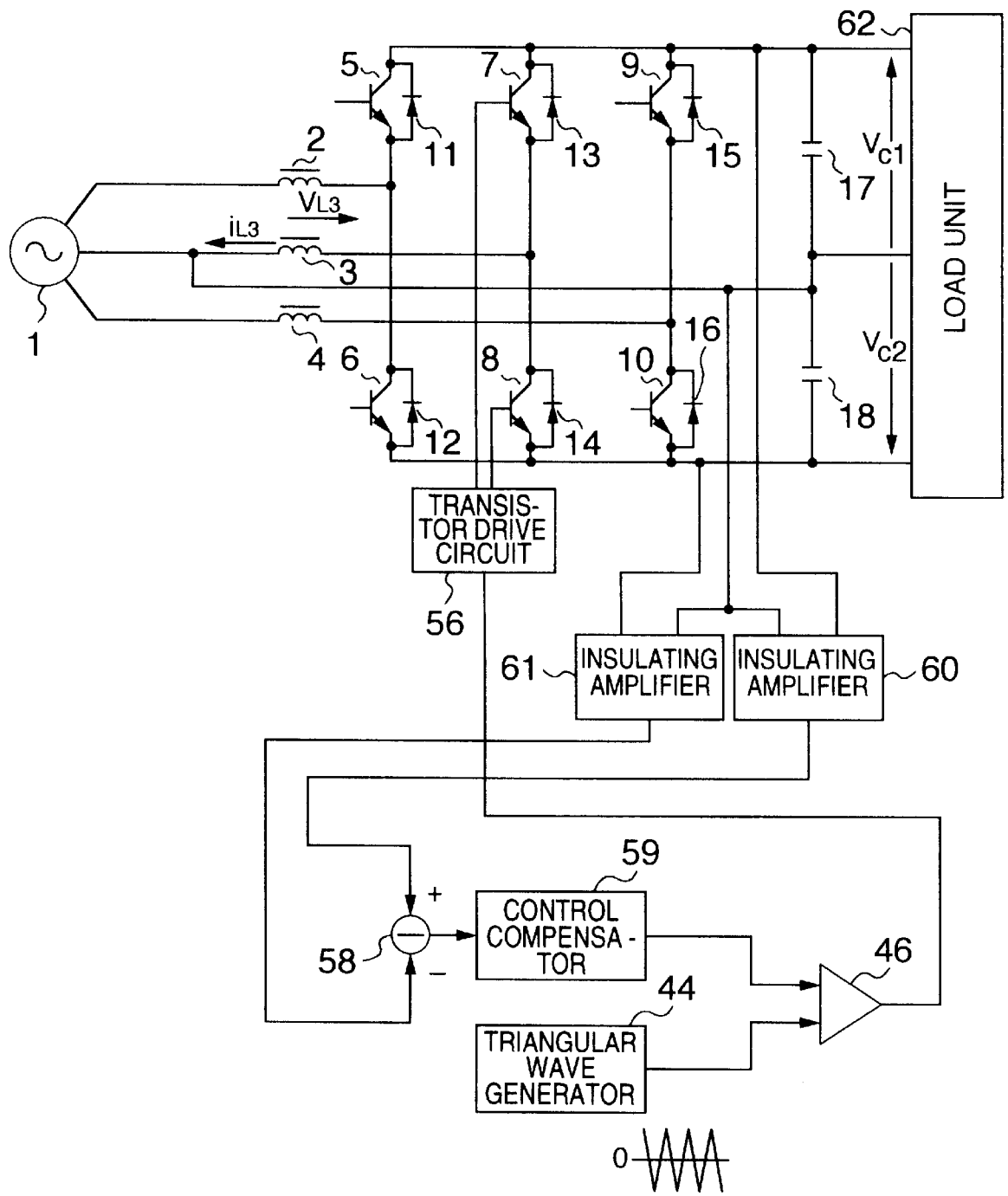
FIG. 2 is a circuit diagram showing a power converter apparatus according to a second embodiment of the invention.

Referring to FIG. 2, a second embodiment of the present invention will be described. A circuit diagram of a power converter apparatus according to the second embodiment of the present invention is illustrated in FIG. 2. The power converter apparatus shown in FIG. 2 is also a forward converter of three-phase AC input type which receives three-phase AC and delivers three-line DC of positive, neutral and negative polarities to a load. The control method differs from that in the first embodiment and hence FIGS. 1 and 2 are different from each other in control circuit configuration. In the Figure, a main circuit including a three-phase AC power supply 1, reactors 2, 3 and 4, transistors 5 and 6, transistors 7 and 8 and transistors 9 and 10, diodes 11 and 12, diodes 13 and 14 and diodes 15 and 16, capacitors 17 and 18, and a load unit 62 has the same construction as the main circuit in the first embodiment of FIG. 1.

Next, a control circuit in the second embodiment will be described. Control of the transistors 5, 6, 9 and 10 is done in the same way as that in the FIG. 1 embodiment and will not be described. The transistors 7 and 8 are controlled as will be described below. Terminal voltages $v_{C1}$ and $v_{C2}$ across the capacitors 17 and 18 are detected by insulating amplifiers 60 and 61, respectively, and detected values of the terminal voltages $v_{C1}$ and $v_{C2}$ across the capacitors 17 and 18 are subtracted from each other by a subtracter 58. An output of the subtracter 58 is applied to a comparator 46 via a control compensator 59. The comparator 46 compares an output of the control compensator 59 with an output of a triangular wave generator 44 to produce a PWM signal. A transistor drive circuit 56 receiving the PWM signal alternately turns on and off the transistors 7 and 8 in the common phase half-bridge type converting circuit of the main circuit.

Figure 3:
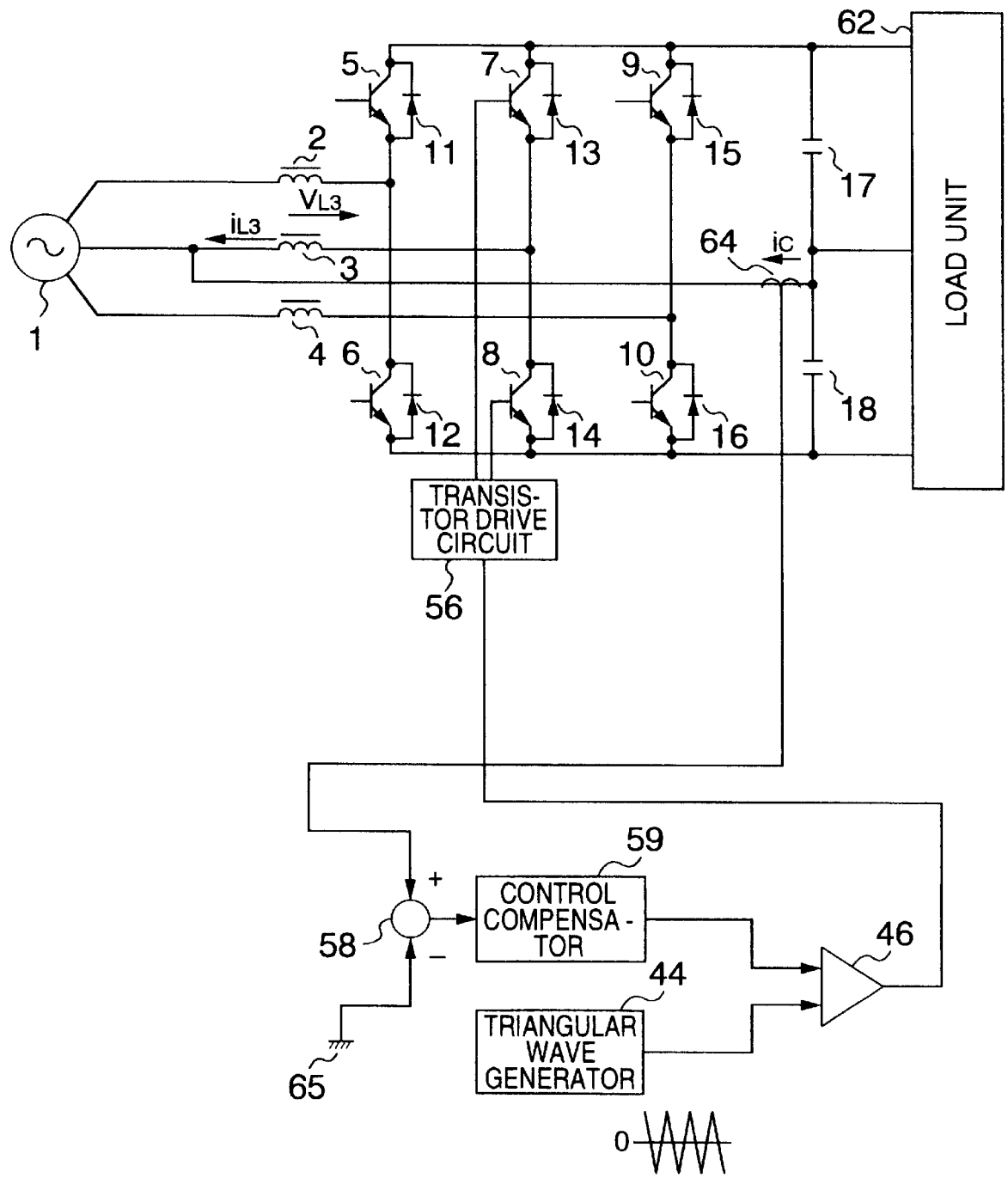
FIG. 3 is a circuit diagram showing a power converter apparatus according to a third embodiment of the invention.
Figure 4A:
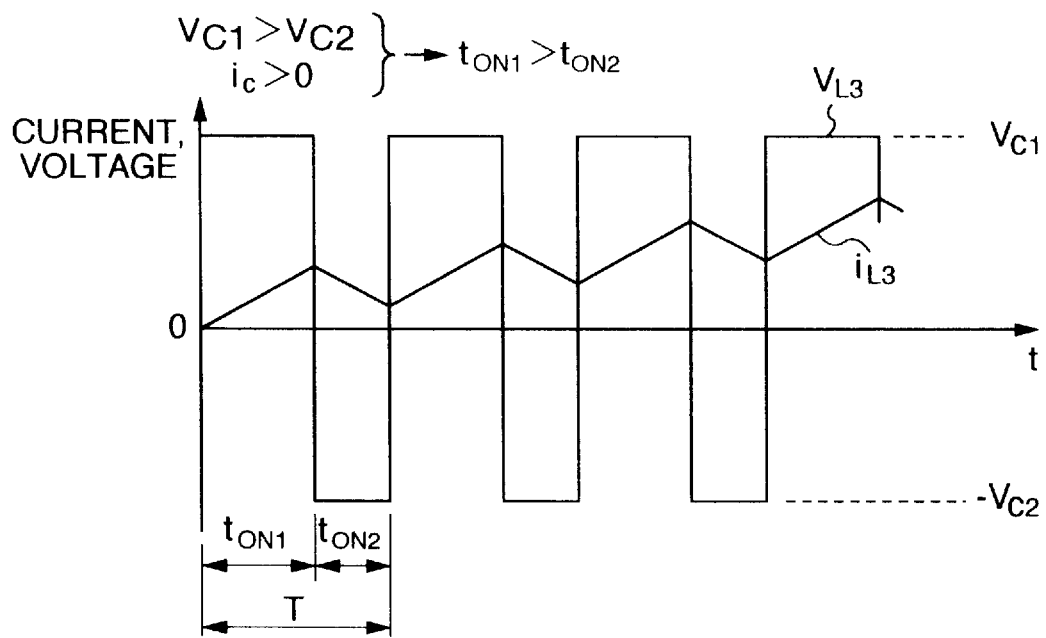
FIGS. 4A and 4B are time charts showing voltage/current waveforms in a reactor 3 in FIGS. 2 and 3.
Figure 4B:
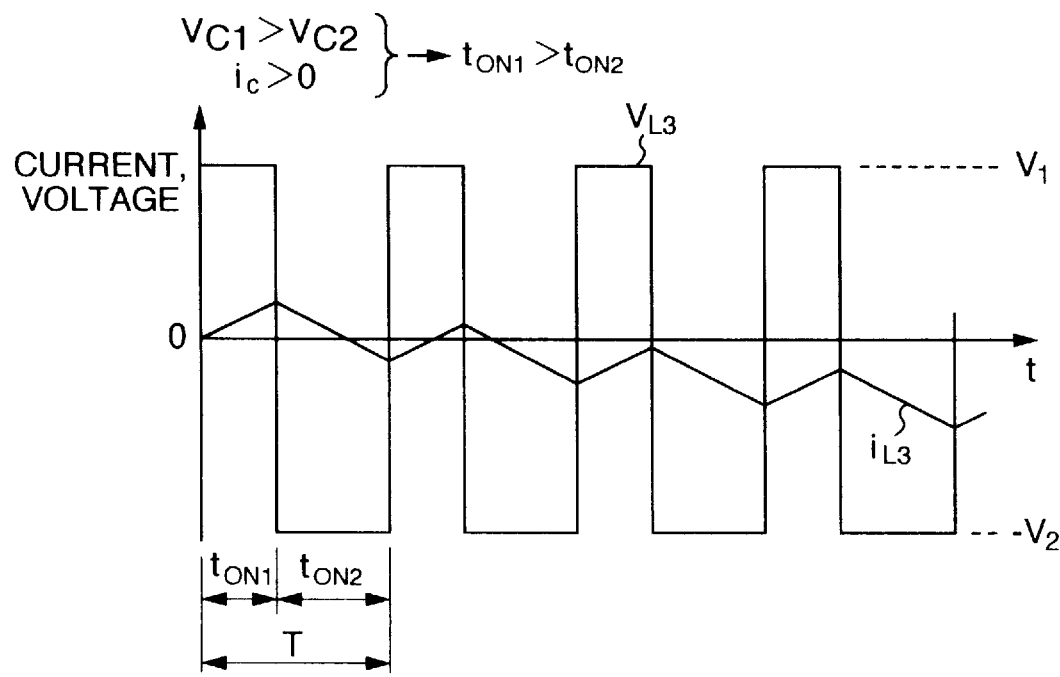

Referring to FIGS. 4A and 4B, voltage/current waveforms in the reactor 3 of FIG. 2 and a reactor 3 of FIG. 3 to be described later are shown. The operation of the circuit constructed as shown in FIG. 2 will be described with reference to FIGS. 4A and 4B.

(a) In the case of $v_{C1} > v_{C2}$

In this case, the output of the subtracter 58 is rendered to be positive and consequently, the PWM signal standing for the output of the comparator 46 has a larger pulse width at positive level. Accordingly, given that switching period T has on-duration $t_{ON1}$ for the positive side transistor 7 and on-duration $t_{ON2}$ for the negative side transistor 8, $t_{ON1}$ is larger than $t_{ON2}$. At that time, a terminal voltage $v_{L3}$ across the reactor 3 (voltage directed as shown in FIG. 2) takes a waveform as shown in FIG. 4A. Since $v_{C1} > v_{C2}$ and $t_{ON1} > t_{ON2}$ stand, an integral value of reactor voltage over one period T becomes positive and current $i_{L3}$ flowing through the reactor 3 increases in the positive direction (current direction shown in FIG. 2). The current in this direction discharges electric charge from the positive side capacitor 17 and charges electric charge to the negative side capacitor 18. In other words, in the case of $v_{C1} > v_{C2}$, the circuit is operated in such a direction that $v_{C1}$ is decreased and conversely, $v_{C2}$ is increased.

(b) In the case of $v_{C1} < v_{C2}$

In this case, the output of the subtracter 58 is rendered to be negative and consequently, the PWM signal standing for the output of the comparator 46 has a smaller pulse width at positive level. Accordingly, on-duration $t_{ON2}$ for the negative side transistor 8 is rendered to be larger than on-duration $t_{ON1}$ for the positive side transistor 7. At that time, a terminal voltage vL3 across the reactor 3 takes a waveform as shown in FIG. 4B. Since $v_{C1} < v_{C2}$ and $t_{ON1} < t_{ON2}$ stand, an integral value of reactor voltage over one period T becomes negative and current iL3 flowing through the reactor 3 increases in the negative direction. The current in this direction charges electric charge to the positive side capacitor 17 and discharges electric charge from the negative side capacitor 18. In other words, in the case of $v_{C1} < v_{C2}$, the circuit operates in such a direction that $v_{C1}$ is increased and conversely, $v_{C2}$ is decreased.

As described above, the circuit operates in such a direction that in the presence of a difference between positive side voltage $v_{C1}$ and negative side $v_{C2}$, the difference is canceled and therefore, the operation becomes stable ultimately at a point (or a nearby point) where the positive side voltage $v_{C1}$ equals the negative side voltage $v_{C2}$. At that time, the difference between the input current from the second phase of the three-phase AC power supply 1 and the output current to the neutral polarity of three-line DC of the load unit 62 is not passed eventually to the capacitors 17 and 18 but flows in the form of a positive-going or negative-going reactor current generated in the reactor 3.

To explain supplementarily, in the previously-described embodiment of FIG. 1, by controlling the input current from the second phase of the three-phase AC power supply 1 such that it is passed to the reactor 3, ripple is removed from terminal voltages across the capacitors 17 and 18. Contrary to this, in the present embodiment of FIG. 2, by controlling terminal voltages across the capacitors 17 and 18 such that they are made to be equal to each other, the difference between the input current from the second phase of the three-phase AC power supply 1 and the output current to the neutral polarity of three-line DC of the load unit 62 is made to act as a reactor current flowing through the reactor 3. Accordingly, in the present second embodiment, the previously-described circuit configuration operates while involving the output current component to the neutral polarity of three-line DC, thereby attaining an advantage that even when a load on the load unit 62 is unbalanced between positive and negative polarities, the terminal voltages across the capacitors 17 and 18 can be made to be stable.

It will be appreciated that in the case of the second embodiment, change detecting circuit is comprised of the insulating amplifiers 60 and 61 and duty controlling circuit is comprised of the triangular wave generator 44, comparator 46, transistor drive circuit 56, subtracter 58 and control compensator 59.

Referring now to FIG. 3, a third embodiment will be described. A circuit diagram of a power converter apparatus according to the third embodiment of the present invention is shown in FIG. 3. The power converter apparatus shown in FIG. 3 is also a forward converter which receives three-phase AC and delivers three-line DC of positive, neutral and negative polarities to a load. The control method (the control circuit configuration) differs from that in the first and second embodiments. In the Figure, a main circuit including a three-phase AC power supply 1, reactors 2, 3 and 4, transistors 5 and 6, transistors 7 and 8, transistors 9 and 10, diodes 11 and 12, diodes 13 and 14 and diodes 15 and 16, capacitors 17 and 18, and a load unit 62 has the same construction as the main circuit in the embodiments of FIGS. 1 and 2.

Next, a control circuit in the third embodiment will be described. Control of the transistors 5, 6, 9 and 10 is performed in the same way as that in the FIG. 1 embodiment and will not be described. The transistors 7 and 8 are controlled as will be described below. Current $i_C$ flowing out of the connecting node of the two series-connected capacitors 17 and 18 is detected by a current transformer 64. A subtracter 58 subtracts a ground value 65 or zero from a detected value of the $i_C$. An output of the subtracter 58 is applied to a comparator 46 via a control compensator 59. The comparator 46 compares an output of the control compensator 59 with an output of a triangular wave generator 44 to produce a PWM signal. A transistor drive circuit 56 receiving the PWM signal alternately turns on and off the transistors 7 and 8 in the common phase half-bridge type converting circuit.

The operation of the circuit constructed as shown in FIG. 3 will be described with reference to FIGS. 4A and 4B.

(a) In the case of $i_C>0$

In this case, the output of the subtracter 58 is rendered to be positive and consequently, the PWM signal standing for the output of the comparator 46 has a larger pulse width at positive level. Accordingly, given that switching period T has on-duration $t_{ON1}$ for the positive side transistor 7 and on-duration $t_{ON2}$ for the negative side transistor 8, $t_{ON1}$ is larger than $t_{ON2}$. At that time, a terminal voltage $v_{L3}$ across the reactor 3 (voltage directed as shown in FIG. 3) takes a waveform as shown in FIG. 4A. Since $t_{ON1}>t_{ON2}$ stands, an integral value of reactor voltage over one period T becomes positive and current $i_{L3}$ flowing through the reactor 3 increases in the positive direction (current direction shown in FIG. 3). The current in this direction acts on current $i_C$ flowing out of the node of the two series-connected capacitors 17 and 18 in the decreasing direction. Namely, for $i_C>0$, the circuit operates in such a direction that $i_C=0$ holds.

(b) In the case of $i_C<0$

In this case, the output of the subtracter 58 is rendered to be negative and consequently, the PWM signal standing for the output of the comparator 46 has a smaller pulse width at positive level. Accordingly, on-duration $t_{ON2}$ for the negative side transistor 8 is rendered to be larger than on-duration $t_{ON1}$ for the positive side transistor 7. At that time, a terminal voltage $v_{L3}$ across the reactor 3 takes a waveform as shown in FIG. 4B. Since $t_{ON1}<t_{ON2}$ stands, an integral value of reactor voltage over one period T becomes negative and current $i_{L3}$ flowing through the reactor 3 increases in the negative direction. The current in this direction acts on current $i_C$ flowing out of the connecting node of the two series-connected capacitors 17 and 18 to cause it to increase. Namely, for $i_C<0$, the circuit operates in such a direction that $i_C=0$ holds.

As described above, the circuit operates to cause the current $i_C$ flowing out of the connecting node of the two series-connected capacitors 17 and 18 to equal zero or to approach zero. At that time, a difference between the input current from the second phase of the three-phase AC power supply 1 and the output current to the neutral polarity of the three-line DC load unit 62 is not passed eventually to the capacitors 17 and 18 but flows in the form of a positive-going or negative-going reactor current generated in the reactor 3. Accordingly, ripple can be removed from terminal voltages across the capacitors 17 and 18. In the present embodiment, too, the previously-described circuit configuration operates while involving the output current component to the neutral polarity of three-line DC and therefore, even when the load unit 62 is a load which is unbalanced between positive and negative polarities, the terminal voltages across the capacitors 17 and 18 can be stable. In the case of the third embodiment, change detecting means corresponds to the current transformer 64 and duty controlling means is comprised of the triangular wave generator 44, comparator 46, transistor drive circuit 56, subtracter 58, control compensator 59 and ground value 65.

Figure 5:
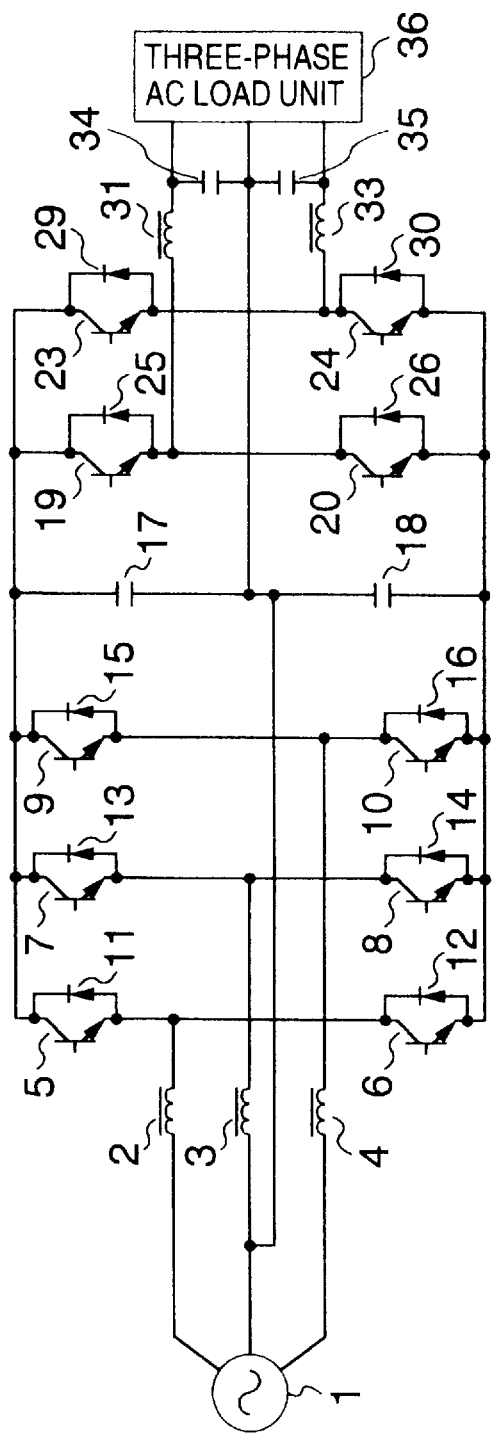
FIG. 5 is a circuit diagram showing a power converter apparatus according to a fourth embodiment of the invention.

Referring to FIG. 5, there is illustrated a circuit diagram of a power converter apparatus according to a fourth embodiment of the present invention. The power converter apparatus of FIG. 5 is a power converter apparatus of three-phase AC input/three-phase AC output type in which a three-phase AC input type forward converter of full-bridge circuit configuration is connected to a three-phase AC output type inverter of half-bridge two-circuit configuration. More particularly, in this power converter apparatus, AC from a three-phase AC power supply 1 is once converted into three-line DC voltage of positive, neutral and negative polarities and the DC voltage is again converted into three-phase AC which in turn is delivered out of a three-phase AC load unit 36. There is illustrated a circuit of an embodiment in which the present invention is applied to the forward converter of full-bridge circuit configuration in the power converter apparatus.

The converter has, for its first phase, transistors 5 and 6 connected in series, diodes 11 and 12 connected in anti-parallel relation to the transistors 5 and 6, respectively, a reactor 2 connected between a node of the transistors 5 and 6 and the first phase of the three-phase AC power supply 1, and two capacitors 17 and 18 connected in series across the series-connected transistors 5 and 6. Similarly, transistors 9 and 10 are connected in series, diodes 15 and 16 are connected in anti-parallel relation to the transistors 9 and 10, respectively, a reactor 4 is connected between a connecting node of the transistors 9 and 10 and the third phase of the three-phase AC power supply 1, and the series-connected transistors 9 and 10 are connected across the two series-connected capacitors 17 and 18 in the same direction as the transistors 5 and 6. Further, the connecting node of the two series-connected capacitors 17 and 18 is connected to the second phase of the three-phase AC power supply 1 to form a common phase.

In addition, transistors 7 and 8 are connected in series, diodes 13 and 14 are connected in anti-parallel relation to the transistors 7 and 8, respectively, a reactor 3 is connected between a node of the transistors 7 and 8 and the second phase of the three-phase AC power supply 1, and the series-connected transistors 7 and 8 are connected across the two series-connected capacitors 17 and 18 in the same direction as the transistors 5 and 6.

Further, transistors 19 and 20 are connected in series, diodes 25 and 26 are connected in anti-parallel relation to the transistors 19 and 20, respectively, a reactor 31 is connected between a node of the transistors 19 and 20 and a first phase of the three-phase AC load unit 36, the series-connected transistors 19 and 20 are connected across the two series-connected capacitors 17 and 18 in the same direction as the transistors 5 and 6. The connecting node of the capacitors 17 and 18 is connected to a second phase of the three-phase AC load unit 36 to form a common phase.

In addition, transistors 23 and 24 are connected in series, diodes 29 and 30 are connected in anti-parallel relation to the transistors 23 and 24, respectively, a reactor 33 is connected between a connecting node of the transistors 23 and 24 and a third phase of the three-phase AC load unit 36, and the series-connected transistors 23 and 24 are connected across the two series-connected capacitors 17 and 18 in the same direction as the transistors 5 and 6.

Further, a capacitor 34 is connected between the first and second phases of the three-phase load unit 36 and a capacitor 35 is connected between the second and third phases of the three-phase AC load unit 36.

With the above construction, by on-off controlling the transistors 5, 6, 9 and 10, AC input is received from the three-phase AC power supply 1 and DC voltage is delivered while maintaining input current sine waves and an input power factor of 1. Further, by on-off controlling the transistors 19, 20, 23 and 24, the DC voltage is applied to supply three-phase sine wave AC voltage to the three-phase AC load unit 36.

The transistors 7 and 8 are on-off controlled by the duty controlling circuit in order that a difference between input current from the second phase of the three-phase AC power supply 1 and current supplied to the second phase of the three-phase AC load unit 36 can be adjusted by a reactor current flowing through the reactor 3. The duty of the transistors 7 and 8 can be controlled by the same control method as that shown in FIG. 2 or 3. Through this, no current flows out of the connecting node of the capacitors 17 and 18 and terminal voltages across the capacitors 17 and 18 can be rendered to be stable. By virtue of stable three-line DC voltage, it is possible to eliminate such a problem that the output of the inverter is unbalanced between positive and negative polarities or a sufficient peak voltage of AC output cannot be obtained because of insufficiency of DC voltage.

The present embodiment in which the second phase of AC input is common to the second phase of AC output can also be applied to the case where one phase grounding is required on both the power supply side and the load side. Further, when the three-line DC circuit (namely, forward converter) and the AC output three-phase circuit (namely, inverter) are viewed from the second phase of AC input serving as a reference, the former is of DC and the latter is of low-frequency AC and therefore, leakage current of the power converter apparatus can be reduced to advantage.

Figure 6:
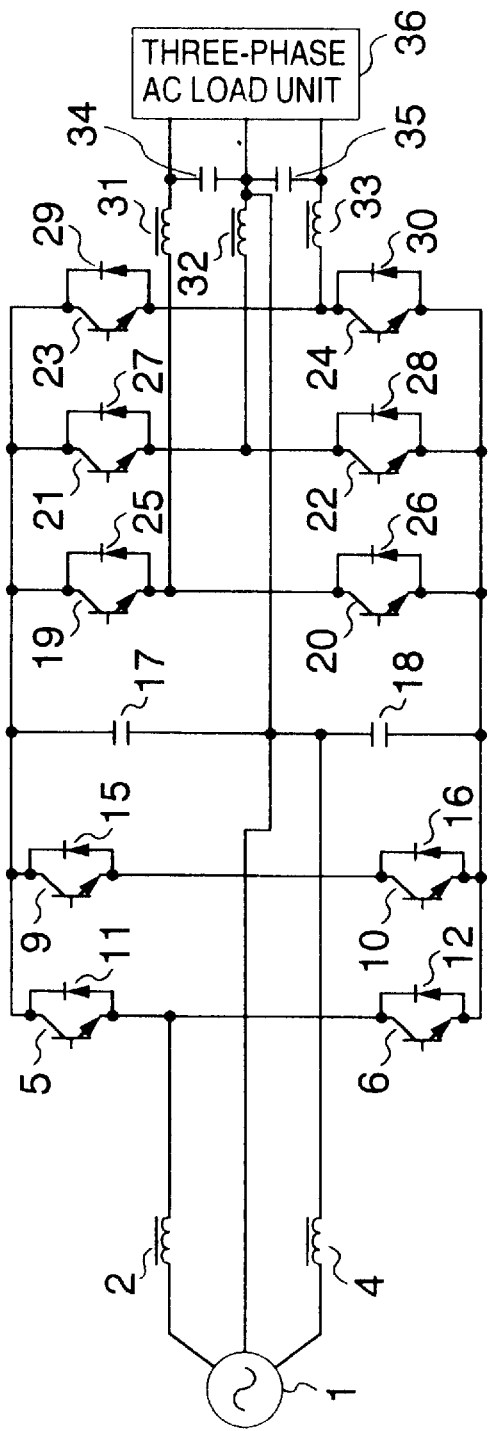
FIG. 6 is a circuit diagram showing a power converter apparatus according to a fifth embodiment of the invention.
Figure 7:
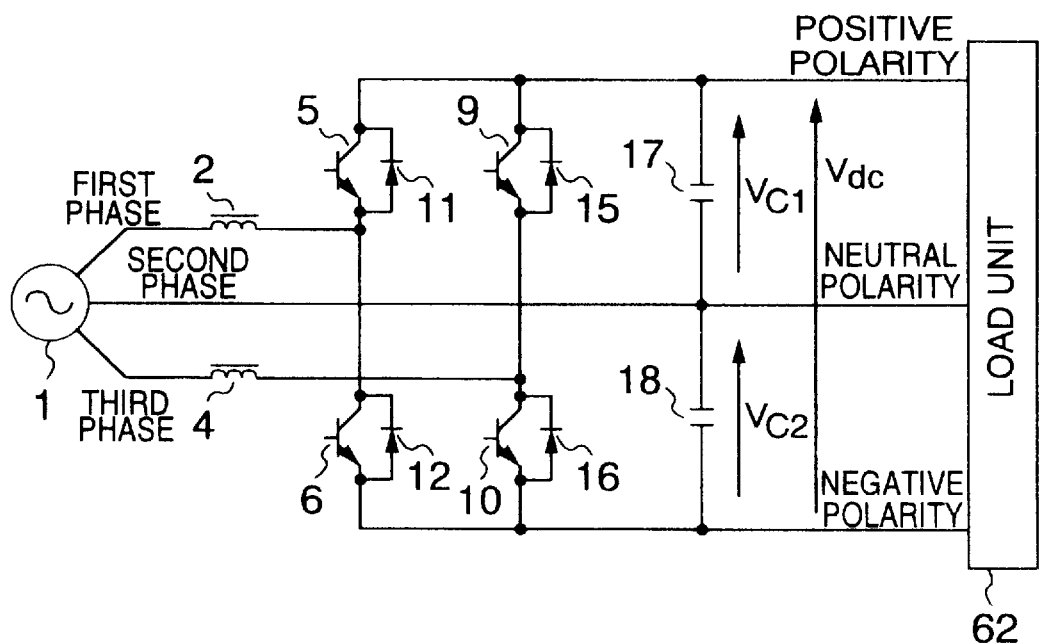
FIG. 7 is a circuit diagram showing a prior art power converter apparatus.
Figure 8:
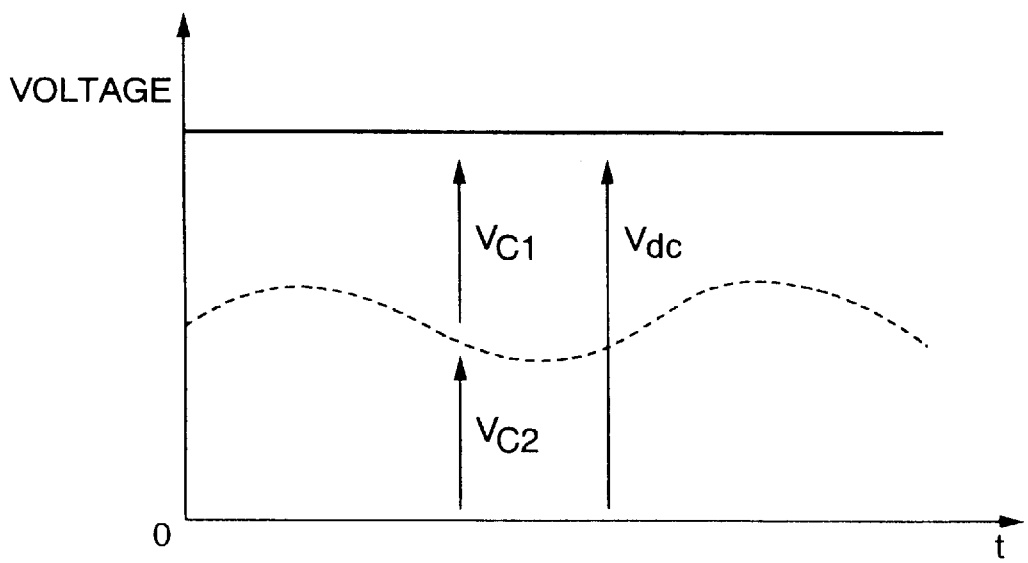
FIG. 8 is a time chart showing waveforms in the power converter apparatus of FIG. 7.

Referring to FIG. 6, there is illustrated a circuit diagram of a power converter apparatus according to a fifth embodiment of the present invention. Like the fourth embodiment of FIG. 5, the fifth embodiment is directed to a power converter apparatus of three-phase AC input/three-phase AC output type. In the fourth embodiment of FIG. 5, the forward converter has the full-bridge circuit configuration and the inverter has the half-bridge two-circuit configuration whereas in the fifth embodiment of FIG. 6, a forward converter has a half-bridge two-circuit configuration and an inverter has a full-bridge circuit configuration. There is illustrated a circuit of an embodiment in which the present invention is applied to the inverter of full-bridge circuit configuration in the power converter apparatus.

The converter has, for its first phase, transistors 5 and 6 connected in series, diodes 11 and 12 connected in anti-parallel relation to the transistors 5 and 6, respectively, a reactor 2 connected between a node of the transistors 5 and 6 and the first phase of a three-phase AC power supply 1, and two capacitors 17 and 18 connected in series across the series-connected transistors 5 and 6. Similarly, transistors 9 and 10 are connected in series, diodes 15 and 16 are connected in anti-parallel relation to the transistors 9 and 10, respectively, a reactor 4 is connected between a node of the transistors 9 and 10 and a third phase of the three-phase AC power supply 1, and the series-connected transistors 9 and 10 are connected across the two series-connected capacitors 17 and 18 in the same direction as the transistors 5 and 6. Further, a node of the capacitors 17 and 18 is connected to a second phase of the three-phase AC power supply 1 to form a common phase.

In addition, transistors 19 and 20 are connected in series, diodes 25 and 26 are connected in anti-parallel relation to the transistors 19 and 20, respectively, a reactor 31 is connected between a connecting node of the transistors 19 and 20 and a first phase of a three-phase AC load unit 36, and the series-connected transistors 19 and 20 are connected across the two series-connected capacitors 17 and 18 in the same direction as the transistors 5 and 6. Similarly, transistors 23 and 24 are connected in series, diodes 29 and 30 are connected in anti-parallel relation to the transistors 23 and 24, respectively, a reactor 33 is connected between a connecting node of the transistors 23 and 24 and a third phase of the three-phase AC load unit 36, and the series-connected transistors 23 and 24 are connected across the two series connected capacitors 17 and 18 in the same direction as the transistors 5 and 6. Further, the connecting node of the capacitors 17 and 18 is connected to a second phase of the three-phase AC load unit 36 to form a common phase. A capacitor 34 is connected between the first and second phases of the three-phase AC load unit 36 and a capacitor 35 is connected between the second and third phases of the three-phase load unit 36.

Further, transistors 21 and 22 are connected in series, diodes 27 and 28 are connected in anti-parallel relation to the transistors 21 and 22, respectively, a reactor 32 is connected between a connecting node of the transistors 21 and 22 and the second phase of the three-phase AC load unit 36, and the series-connected transistors 21 and 22 are connected across the two series-connected capacitors 17 and 18 in the same direction as the transistors 5 and 6.

With the above construction, by on-off controlling the transistors 5, 6, 9 and 10, AC input is received from the three-phase AC power supply 1 and DC voltage is delivered while maintaining input current sine waves and an input power factor of 1. Further, by on-off controlling the transistors 19, 20, 23 and 24, the DC voltage is applied to supply three-phase sine wave AC voltage to the three-phase AC load unit 36.

The transistors 21 and 22 are on-off controlled by the duty controlling circuit in order that a difference between input current from the second phase of the three-phase AC power supply 1 and current supplied to the second phase of the three-phase AC load unit 36 can be adjusted by a reactor current flowing through the reactor 3.

The duty of the transistors 21 and 22 can also be controlled by the same control method as that shown in FIG. 2 or 3. Through this, no current flows out of the connecting node of the capacitors 17 and 18 and terminal voltages across the capacitors 17 and 18 can be rendered to be stable. By virtue of stable three-line DC voltage, it is possible to eliminate such a problem that the output of the inverter is unbalanced between positive and negative polarities or a sufficient peak voltage of AC output cannot be obtained because of insufficiency of DC voltage.

The present embodiment in which the second phase of AC input is also common to the second phase of AC output can also be applied to the case where one phase grounding is required on both the power supply side and the load side. Further, when the three-line DC circuit and the AC output three-phase circuit are viewed from the second phase of AC input serving as a reference, the former is of DC and the latter is of low-frequency AC and therefore, leakage current of the power converter apparatus can be reduced to advantage.

Figure 9:
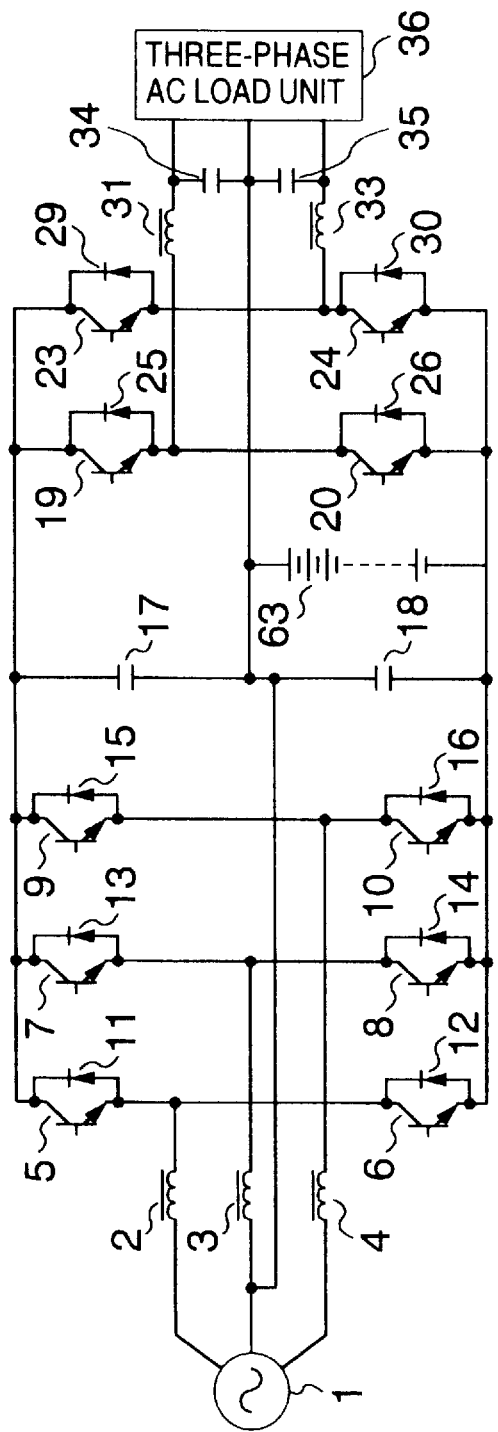
FIG. 9 is a circuit diagram showing a power converter apparatus according to a sixth embodiment of the invention.

A sixth embodiment will be described with reference to FIG. 9 being a circuit diagram showing a power converter apparatus according to the sixth embodiment of the present invention. In this embodiment, the present invention is applied to a power converter apparatus in the form of a power-failure-safe power supply apparatus. More particularly, in the circuit of the fourth embodiment shown in FIG. 5, a storage battery 63 serving as a DC power accumulator is connected in parallel with a capacitor 18 between neutral and negative polarities of DC. The capacitor may otherwise be connected between neutral and positive polarities.

During normal operation, three-phase AC is inputted from a three-phase AC power supply 1 and a forward converter including reactors 2, 3 and 4, transistors 5 to 10 and diodes 11 to 16 charges the storage battery 63 and at the same time, supplies DC to an inverter including transistors 19, 20, 23 and 24, diodes 25, 26, 29 and 30, reactors 31 and 33 and capacitors 34 and 35. The inverter again converts the DC into AC so that three-phase AC may be supplied from a three-phase AC load unit 36.

Like the fourth embodiment, by controlling the forward converter of the present invention in accordance with the method described in connection with FIG. 2 or 3, the DC three-line circuit voltage can be made to be stable while eliminating unbalance between terminal voltages across the capacitors 17 and 18 due to charge/discharge current of the storage battery 63. But in the case where control shown in FIG. 3 is applied, the current transformer 64 is required to have capability to also detect DC current.

Incidentally, when power failure of input from the three-phase AC power supply 1 occurs, the transistors 5, 6, 9 and 10 of the previously-described forward converter are turned off but by virtue of the storage battery 63 provided in the DC circuit, supply of DC voltage continues to thereby permit the inverter to keep supplying stable voltage to the three-phase load unit 36 to advantage. A different power-failure-safe power supply can be constructed by connecting a storage battery 63 between positive and negative polarities of DC but the connection of the storage battery 63 between neutral and negative (or positive) polarities as in the present embodiment is advantageous in that the number of cells of the storage battery can be reduced.

According to the present invention, in the power converter apparatus in which at least one of input and output is AC, part of the circuit is a three-line DC circuit and one phase of AC is common to the neutral polarity of DC, current flowing into the node of the two series-connected capacitors can be rendered to be substantially zero excepting the carrier frequency component and terminal voltages across the two series-connected capacitors can be equal to each other. Accordingly, even when the electrostatic capacitances of the two series-connected capacitors adapted to decrease voltage unbalance are small, voltage of the three-line DC circuit can be rendered to be stable and a compact and easy-to-use power converter apparatus can be obtained.

We claim:

1. A power converter apparatus comprising:

positive and neutral polarities of DC, a negative side capacitor connected between neutral and negative polarities of the DC, a first-phase half-bridge type converting circuit including two switching elements connected in series between said positive and negative polarities, diodes connected in anti-parallel relation to said switching elements, respectively, and a reactor connected between a node of said two series-connected switching elements and a first phase of AC, a third-phase half-bridge type converting circuit including two switching elements connected in series between said positive and negative polarities, diodes connected in anti-parallel relation to said switching elements, respectively, and a reactor connected between a connecting node of said two series-connected switching elements and a third phase of AC, and a common phase connecting said neutral polarity of the DC and a second phase of the AC, whereby the AC having said first to third phases is converted into the DC having said positive, neutral and negative polarities;

a common-phase half-bridge type converting circuit including two switching elements connected in series between said positive and negative polarities, diodes connected in anti-parallel relation to said switching elements, respectively, and a reactor connected between a connecting node of said two series-connected switching elements and said common phase;

a change detecting circuit detecting a temporal change of an electric signal flowing through said common phase; and a duty controlling circuit changing the on-off duty of said two series-connected switching elements in said common phase half-bridge circuit on the basis of the temporal change of the electric signal detected by said change detecting circuit.

2. A power converter apparatus according to claim 1, wherein said change detecting circuit detects the temporal change of the electric signal from a reactor current flowing through said reactor connected to said common phase.

3. A power converter apparatus according to claim 1, wherein said change detecting circuit detects the temporal change of the electric signal from a terminal voltage across said positive side capacitor and a terminal voltage across said negative side capacitor.

4. A power converter apparatus according to claim 1, wherein said change detecting circuit detects the temporal change of the electric signal from a current flowing to said positive side capacitor from said neutral polarity and a current flowing to said negative side capacitor from said neutral polarity.

5. A power converter apparatus according to claim 1, wherein said duty controlling circuit controls the electric signal such that the electric signal is zero or approaches zero.

6. A power converter apparatus having a forward converter for converting input three-phase AC into three-line DC, and an inverter having two half-bridge type converting circuits for converting positive and negative polarities of the three-line DC so as to deliver two phases of AC from said half-bridge type converting circuits and to deliver remaining one phase of AC from a common phase connected to the neutral polarity of the three-line DC, said forward converter comprising a positive side capacitor connected between positive and neutral polarities of DC, a negative side capacitor connected between neutral and negative polarities of the DC, a first-phase half-bridge type converting circuit including two switching elements connected in series between said positive and negative polarities, diodes connected in anti-parallel relation to said switching elements, respectively, and a reactor connected between a node of said tow series-connected switching elements and a first phase of AC, a third-phase half-bridge type converting circuit including two switching elements connected in series between said positive and negative polarities, diodes connected in anti-parallel relation to said switching elements, respectively, and a reactor connected between a connecting node of said two series-connected switching elements and a third phase of AC, and a common phase connecting said neutral polarity of the DC and a second phase of the AC, whereby the AC having said first to third phases is converted into the DC having said positive, neutral and negative polarities;

a common-phase half-bridge type converting circuit including two switching elements connected in series between said positive and negative polarities, diodes connected in anti-parallel relation to said switching elements, respectively, and a reactor connected between a connecting node of said two series-connected switching elements and said common phase;

a change detecting circuit detecting a temporal change of an electric signal flowing through said common phase; and a duty controlling circuit changing the on-off duty of said two series-connected switching elements in said common phase half-bridge circuit on the basis of the temporal change of the electric signal detected by said change detecting circuit.

7. A power converter apparatus according to claim 6, wherein said change detecting circuit detects the temporal change of the electric signal from a reactor current flowing through said reactor connected to said common phase.

8. A power converter apparatus according to claim 6, wherein said change detecting circuit detects the temporal change of the electric signal from a terminal voltage across said positive side capacitor and a terminal voltage across said negative side capacitor.

9. A power converter apparatus according to claim 6, wherein said change detecting circuit detects the temporal change of the electric signal from a current flowing to said positive side capacitor from said neutral polarity and a current flowing to said negative side capacitor from said neutral polarity.

10. A power converter apparatus according to claim 6, wherein said duty controlling circuit controls the electric signal such that the electric signal is zero or approaches zero.

11. A power converter apparatus having a forward converter for converting input three-phase AC into three-line DC, an inverter having two half-bridge type converting circuits for converting positive and negative polarities of the three-line DC so as to deliver two phases of AC from said half-bridge type converting circuits and to deliver remaining one phase of AC from a common phase connected to the neutral polarity of the three-line DC, and a DC power accumulator connected between two polarities of either positive and neutral polarities or negative and neutral polarities, said forward converter comprising a positive side capacitor connected between positive and neutral polarities of DC, a negative side capacitor connected between neutral and negative polarities of the DC, a first-phase half-bridge type converting circuit including two switching elements connected in series between said positive and negative polarities, diodes connected in anti-parallel relation to said switching elements, respectively, and a reactor connected between a node of said tow series-connected switching elements and a first phase of AC, a third-phase half-bridge type converting circuit including two switching elements connected in series between said positive and negative polarities, diodes connected in anti-parallel relation to said switching elements, respectively, and a reactor connected between a connecting node of said two series-connected switching elements and a third phase of AC, and a common phase connecting said neutral polarity of the DC and a second phase of the AC, whereby the AC having said first to third phases is converted into the DC having said positive, neutral and negative polarities;

a common-phase half-bridge type converting circuit including two switching elements connected in series between said positive and negative polarities, diodes connected in anti-parallel relation to said switching elements, respectively, and a reactor connected between a connecting node of said two series-connected switching elements and said common phase;

a change detecting circuit detecting a temporal change of an electric signal flowing through said common phase; and a duty controlling circuit changing the on-off duty of said two series-connected switching elements in said common phase half-bridge circuit on the basis of the temporal change of the electric signal detected by said change detecting circuit.

12. A power converter apparatus according to claim 11, wherein said change detecting circuit detects the temporal change of the electric signal from a reactor current flowing through said reactor connected to said common phase.

13. A power converter apparatus according to claim 11, wherein said change detecting circuit detects the temporal change of the electric signal from a terminal voltage across said positive side capacitor and a terminal voltage across said negative side capacitor.

14. A power converter apparatus according to claim 11, wherein said change detecting circuit detects the temporal change of the electric signal from a current flowing to said positive side capacitor from said neutral polarity and a current flowing to said negative side capacitor from said neutral polarity.

15. A power converter apparatus according to claim 11, wherein said duty controlling circuit controls the electric signal such that the electric signal is zero or approaches zero.

16. A power converter apparatus comprising:

a forward converter for converting input three-phase AC into three-line DC and an inverter having two half-bridge type converting circuits for converting positive and negative polarities of the three-line DC so as to deliver two phases of AC from said half-bridge type converting circuits and to deliver remaining one phase of the AC from a common phase connected to a neutral polarity of the three-line DC, wherein said inverter includes a common phase half-bridge type converting circuit including two switching elements connected in series between said positive and negative polarities, diodes connected in anti-parallel relation to said switching elements, respectively, a reactor connected between a node of said two series-connected switching elements and said common phase, change detecting means for detecting a temporal change of an electric signal flowing through said common phase, and duty controlling means for changing the on-off duty of said two series-connected switching elements in said common phase half-bridge circuit on the basis of the temporal change of the electric signal.

17. A power converter apparatus according to claim 16, wherein said duty controlling circuit controls the electric signal such that the electric signal is zero or approaches zero.

* * * * *